UNITED STATES PATENT OFFICE.

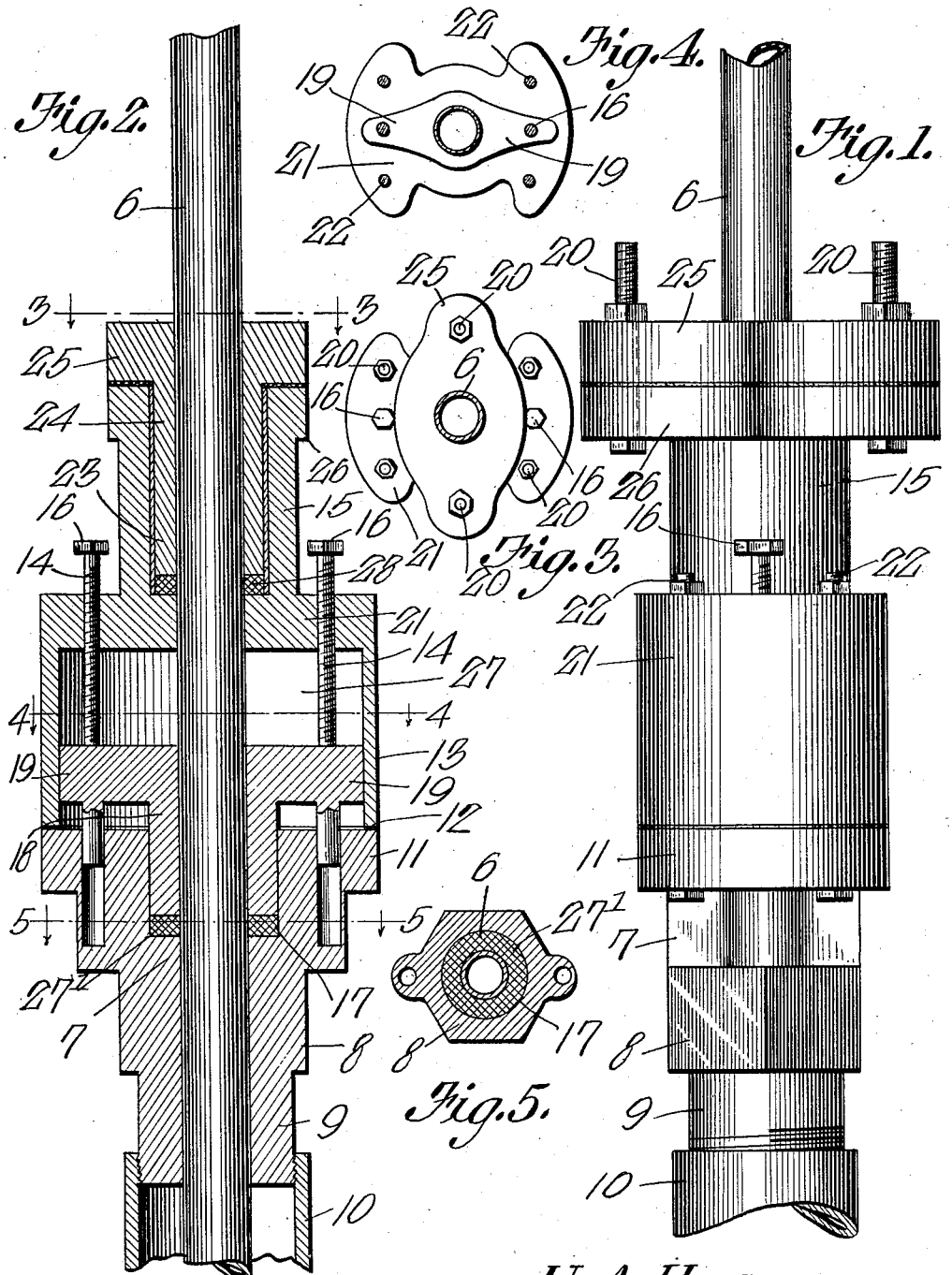

URBANA A. HAASER, OF LAWRENCEVILLE, ILLINOIS.

DOUBLE PACKING STUFFING-BOX.

1,015,884.      Specification of Letters Patent.      Patented Jan. 30, 1912.

Application filed July 24, 1911. Serial No. 640,291.

*To all whom it may concern:*

Be it known that I, URBANA A. HAASER, a citizen of the United States, residing at Lawrenceville, in the county of Lawrence and State of Illinois, have invented a new and useful Double Packing Stuffing-Box, of which the following is a specification.

This invention relates to stuffing boxes and has for its object to provide a main stuffing box and an auxiliary stuffing box which can be brought into operation upon the packing in the main stuffing box being renewed.

With the above and other objects in view this invention is embodied in the novel construction, arrangement and combination of parts as hereinafter described and as shown in the accompanying drawings, in which similar reference characters indicate similar parts and in which:—

Figure 1 is an elevation of the stuffing box. Fig. 2 is a vertical section thereof. Fig. 3 is a section on the line 3—3 of Fig. 2, diminished in size. Fig. 4 is a section on the line 4—4 of Fig. 2, diminished in size. Fig. 5 is a section on the line 5—5 of Fig. 2, diminished in size.

Referring specifically to the drawings, there is shown at 6 a piston rod or plunger and at 10 the tube or cylinder of a pump, the invention being illustrated as applied to a pump for oil or water wells, but it is understood that this stuffing box is applicable for various purposes.

The stuffing box comprises a lower member 7 and an upper member 21 through which the piston rod passes and which are secured together by means of bolts 22, a gasket of rubber or other suitable material 12 being disposed between the two members to form a tight joint. A cuff 15 projects upward from the upper member 21 and is concentric with the piston rod forming therein the stuffing box 23. At the upper end this cuff 15 has a flange 26. A gland 24 through which the piston rod passes is adapted to enter the stuffing box 23 and has the upper flange 25 which is adapted to be secured to the flange 26 by bolts 20.

The lower member 7 has an upper stuffing box 17 and a nipple 9 depending therefrom which is externally screw threaded and adapted to be engaged with the cylinder 10. The said member is also provided at its intermediate portion with a hexagonal shaped periphery for convenience in screwing the member into the cylinder 10. In the lower end of the upper member 21 is provided a recess 27 and jam bolts 14 having the heads 16 on their upper ends pass through the upper end of the member 21 and extend into the opposite sides of the recess 27. A gland 18 movable into the said recess, being provided with diametrically opposed ears 19 at its upper end within the recess against which the jam nuts 14 are adapted to bear. This gland 18 is adapted to be forced into the stuffing box 17 by screwing the jam nuts 14 downward.

In use, the jam nuts 14 are loosened which allows the gland 18 to become loosened therefore expanding the packing 27' in the stuffing box 17 and the gland 24 is forced into the stuffing box 23 which contains suitable packing 28 to compress the packing and form a tight sliding fit between the piston rod and the packing. Upon the packing in the stuffing box 23 wearing out the jam bolts 14 are tightened to force the gland 18 into the stuffing box 17 to compress the packing 27' therein, the said parts forming the supplemental stuffing box, and then the upper gland 24 is removed by removing the bolts 20 from the flanges 25 and 26 which permits new packing to be inserted into the stuffing box 23. After the new packing has been inserted in the stuffing box 23 the gland 24 is again secured in position to compress the packing of the main stuffing box and the jam bolts 14 are then loosened allowing the gland 18 to again work into the recess 27 to permit the packing 27' to expand thus relieving the same from wear and tear due to the reciprocation of the piston rod. For the reason that the supplemental stuffing box is only used as the main stuffing box in being repacked it has a comparatively long life, and also permits the main stuffing box to be repacked without stopping the movement of the piston rod which is necessary where a single stuffing box is used.

This device is simple in its construction rendering it cheap to manufacture and is efficient in its operation.

What is claimed as new is:—

A device of the character described, comprising an upper and a lower member, the lower member having an upper stuffing box and a depending screw-threaded nipple, and the upper member having a lower recess and an upper stuffing box, the said members being adapted to have a piston rod pass therethrough, a gland arranged in the recess of the upper member and adapted to enter the stuffing box in the lower member, jam nuts carried by the upper member adapted to force the said gland into the said stuffing box of the lower member, and a gland for the stuffing box of the upper member.

In testimony that I claim the foregoing as my own, I have hereto affixed my signature in the presence of two witnesses.

URBANA A. HAASER.

Witnesses:
ODIN H. HEDDEN,
OTTO W. LONGENECKER.

Copies of this patent may be obtained for five cents each, by addressing the "Commissioner of Patents, Washington, D. C."